US007042670B2

(12) United States Patent
Feng et al.

(10) Patent No.: US 7,042,670 B2
(45) Date of Patent: May 9, 2006

(54) METHOD FOR ADJUSTING FLYING HEIGHT OF MAGNETIC HEADS USING AN ELECTRICAL CHARGE THROUGH AN ELECTRICAL PAD ON THE SLIDER

(75) Inventors: Zhu Feng, Pleasanton, CA (US); Ellis Cha, San Ramon, CA (US); David Hu, Los Altos, CA (US); Yen Fu, San Jose, CA (US)

(73) Assignee: SAE Magnetics (H.K.) Ltd., Shatin (HK)

( * ) Notice: Subject to any disclaimer, the term of this patent is extended or adjusted under 35 U.S.C. 154(b) by 112 days.

(21) Appl. No.: 10/618,145

(22) Filed: Jul. 11, 2003

(65) Prior Publication Data

US 2005/0007687 A1    Jan. 13, 2005

(51) Int. Cl.
*G11B 5/60* (2006.01)
(52) U.S. Cl. ...................................................... 360/75
(58) Field of Classification Search .................. 360/75, 360/69, 234.4, 234.5, 245.8, 294.7
See application file for complete search history.

(56) References Cited

U.S. PATENT DOCUMENTS

| 5,748,412 | A  | * | 5/1998  | Murdock et al. ............ 360/323 |
| 5,901,014 | A  | * | 5/1999  | Hiraoka et al. ........... 360/234.5 |
| 6,359,746 | B1 | * | 3/2002  | Kakekado et al. ............. 360/75 |
| 6,577,466 | B1 | * | 6/2003  | Meyer et al. .................. 360/75 |
| 6,621,661 | B1 | * | 9/2003  | Ichikawa et al. ......... 360/234.5 |
| 6,700,724 | B1 | * | 3/2004  | Riddering et al. ............. 360/69 |
| 6,757,120 | B1 | * | 6/2004  | Minoshima et al. ........... 360/75 |
| 6,775,089 | B1 | * | 8/2004  | Bonin et al. ................... 360/75 |
| 2002/0097517 | A1 | * | 7/2002  | Bonin et al. ................... 360/75 |
| 2003/0043497 | A1 | * | 3/2003  | Riddering et al. ............. 360/75 |
| 2004/0233568 | A1 | * | 11/2004 | Rao et al. ...................... 360/75 |

FOREIGN PATENT DOCUMENTS

JP          019161233 A  *  6/1997

* cited by examiner

*Primary Examiner*—David Hudspeth
*Assistant Examiner*—James L Habermehl
(74) *Attorney, Agent, or Firm*—Kenyon & Kenyon LLP

(57) ABSTRACT

A system and method for adjusting the flying height of a magnetic head above a magnetic storage medium, such as a disk, is disclosed. A charging electrical pad may be coupled to the slider separate from the magnetic head to allow a charging electrical conductor to apply an electrical charge to the slider. By acting as a quasi-parallel capacitor, the amount of spacing in the head-disk interface may be increased or decreased based on the amount of voltage applied. The slider may be electrically isolated from the suspension. A feedback control system may monitor and control the head-disk spacing by measuring temperature or other environmental conditions surrounding the slider and disk.

26 Claims, 5 Drawing Sheets

METHOD FOR ADJUSTING FLYING HEIGHT OF MAGNETIC HEADS USING AN ELECTRICAL CHARGE THROUGH AN ELECTRICAL PAD ON THE SLIDER

BACKGROUND INFORMATION

The present invention relates to magnetic hard disk drives. More specifically, the present invention relates to a method of adjusting the flying height of magnetic heads over magnetic storage media through an electrical pad on the slider.

Hard disk drives are common information storage devices essentially consisting of a series of rotatable disks, or other magnetic storage mediums, that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately less than one micro-inch (25.4 nm) above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

As shown in FIG. 1 an ABS design known for a common catamaran slider 5 may be formed with a pair of parallel rails 2 and 4 that extend along the outer edges of the slider surface facing the disk. Other ABS configurations including three or more additional rails, with various surface areas and geometries, have also been developed. The two rails 2 and 4 typically run along at least a portion of the slider body length from the leading edge 6 to the trailing edge 8. The leading edge 6 is defined as the edge of the slider that the rotating disk passes before running the length of the slider 5 towards a trailing edge 8. As shown, the leading edge 6 may be tapered despite the large undesirable tolerance typically associated with this machining process. The transducer or magnetic element 7 is typically mounted at some location along the trailing edge 8 of the slider as shown in FIG. 1. The rails 2 and 4 form an air bearing surface on which the slider flies, and provide the necessary lift upon contact with the air flow created by the spinning disk. As the disk rotates, the generated wind or air flow runs along underneath, and in between, the catamaran slider rails 2 and 4. As the air flow passes beneath the rails 2 and 4, the air pressure between the rails and the disk increases thereby providing positive pressurization and lift. Catamaran sliders generally create a sufficient amount of lift, or positive load force, to cause the slider to fly at appropriate heights above the rotating disk.

As illustrated in FIG. 2, a head gimbal assembly 40 often provides the slider with multiple degrees of freedom such as vertical spacing, or pitch angle and roll angle which describe the flying height of the slider. As shown in FIG. 2, a suspension 74 holds the HGA 40 over the moving disk 76 (having edge 70) and moving in the direction indicated by arrow 80. In operation of the disk drive shown in FIG. 2, an actuator 72 (such as a voice-coil motor (VCM)) moves the HGA over various diameters of the disk 76 (e.g., inner diameter (ID), middle diameter (MD) and outer diameter (OD)) over arc 75.

Ideally, the head-disk spacing should stay unchanged at different temperatures. However, the flying height or head-disk spacing changes with environmental temperature fluctuations. The reasons for the flying height change are the changes in head geometry such as crown and camber. At extremely low temperatures, for example, the flying height change can be up to a few nanometers due to head geometry change, leading to degraded recording performance or malfunction of the head. To solve this problem, two methods have been used to compensate the flying height change at low temperatures. In one method, a heating coil is built in the head, which causes the read-write area to protrude. The actual head-disk spacing remains unchanged. Since the heating coil is added to the head in the wafer level, this method adds complications to the overall manufacturing process. In an alternative method, a high current is run through the writer to heat up and to protrude the pole area, leading to flying height adjustment. As can be seen, both techniques try to achieve protruding of the pole tip area. This may move the minimum flying height point to the protruded pole-tip area, leaving it unprotected against possible contact from distortions on the disk surface. dr

DETAILED DESCRIPTION

A system and method for adjusting the flying height of a magnetic head above a magnetic storage medium, such as a disk, is disclosed. A charging electrical pad may be coupled to the slider separate from the magnetic head to allow a charging electrical conductor to apply an electrical charge to the slider. By acting as a quasi-parallel capacitor, the amount of spacing in the head-disk interface may be increased or decreased based on the amount of voltage applied. The slider may be electrically isolated from the suspension. A feedback control system may monitor and control the head-disk spacing by measuring temperature or other environmental conditions surrounding the slider and disk.

Figure 1:
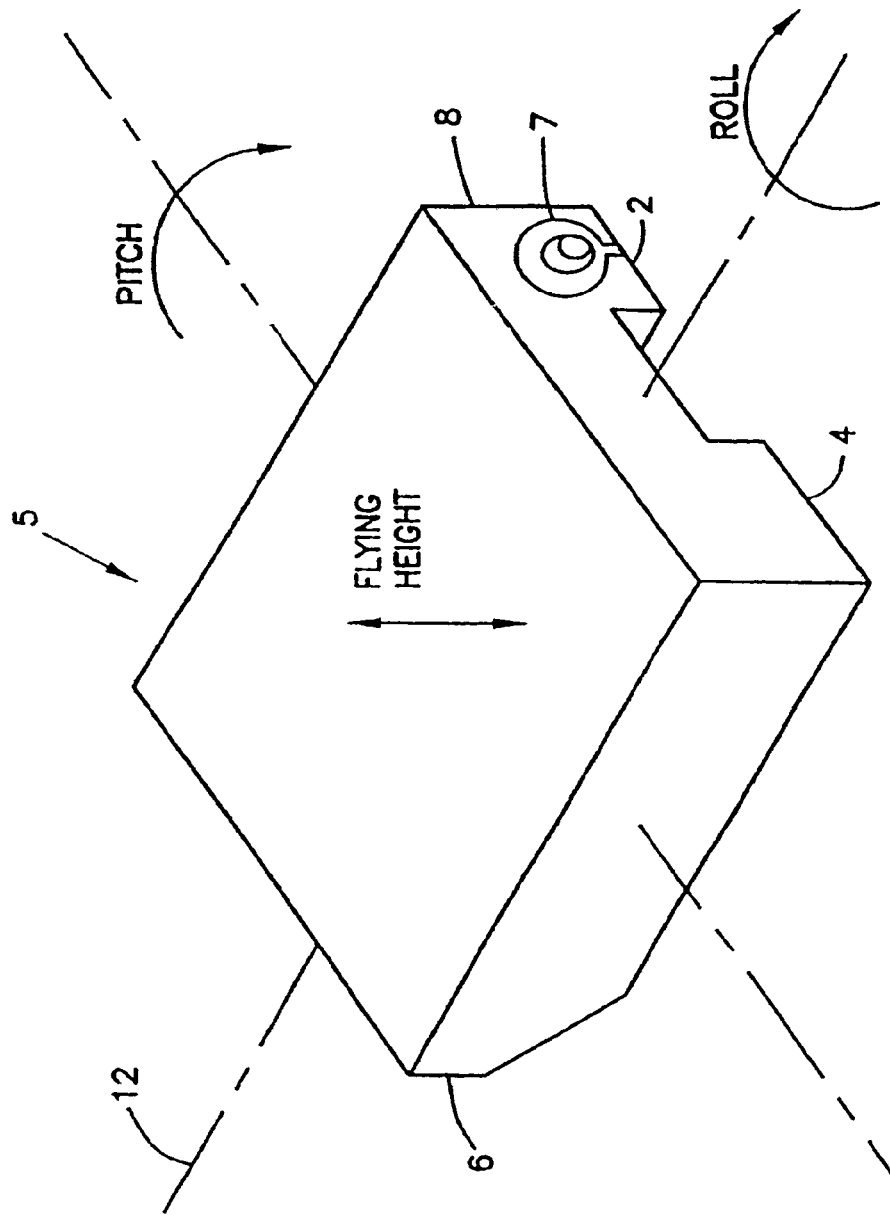
FIG. 1 is a perspective view of a slider device with a read/write head that is known in the art.
Figure 2:
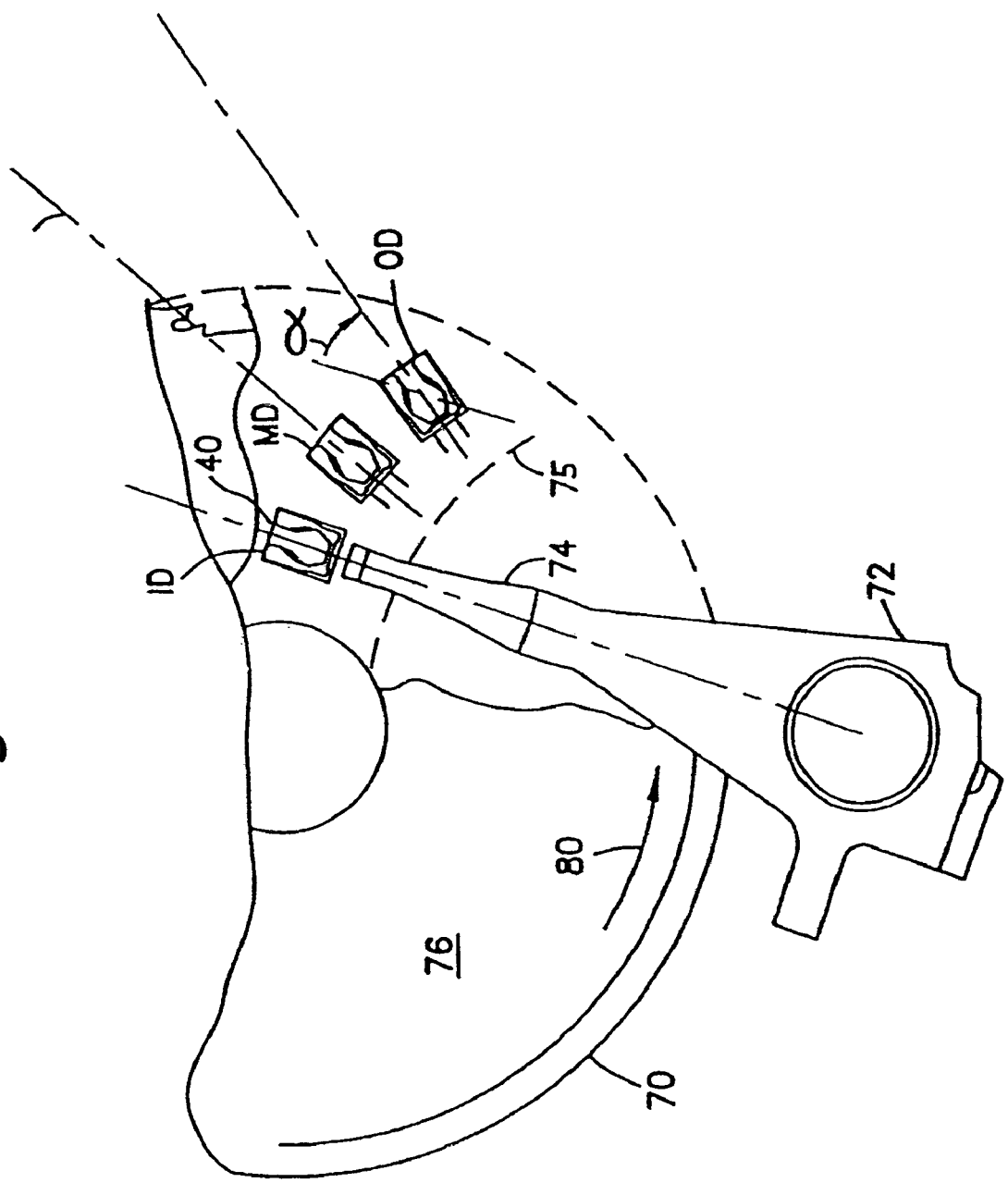
FIG. 2 is a perspective view of a disk drive device that is known in the art.
Figure 3:
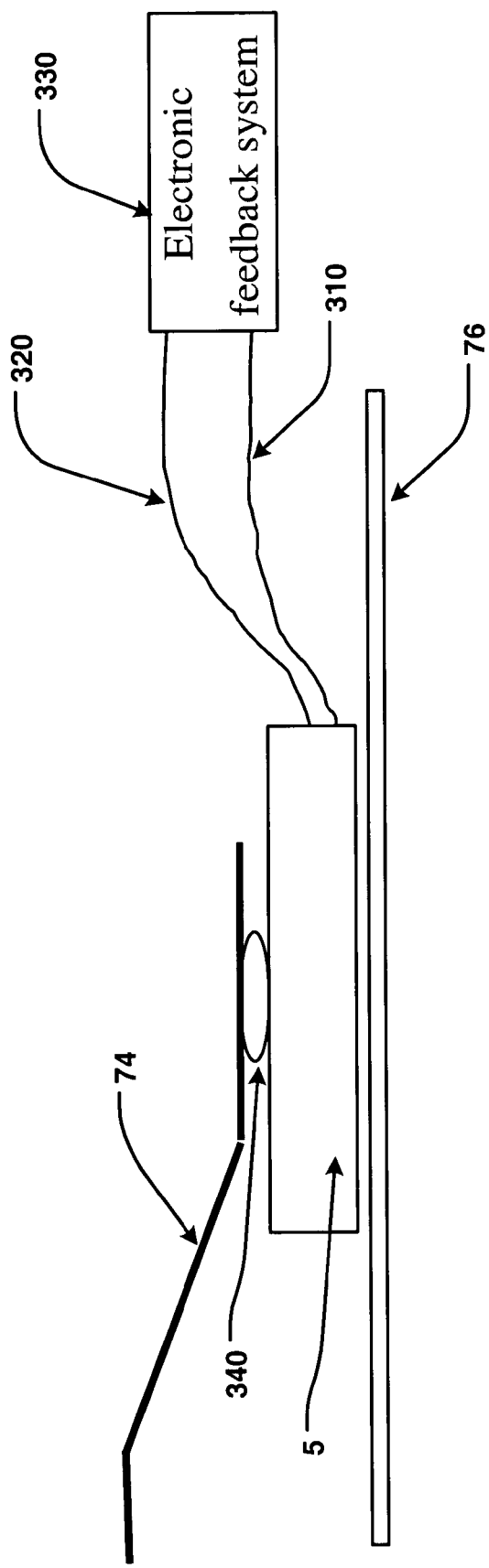
FIG. 3 illustrates one embodiment of the slider and suspension as practiced in the present invention.

FIG. 3 illustrates one embodiment of the slider and suspension as practiced in the present invention. The slider 5 contains the magnetic read/write head 7, or magnetic read/write transducer. The interface between the head 7 and the disk 76 may be modeled as a quasi-parallel capacitor. The magnetic head 7 acts as an upper electrode while the magnetic disk 76 acts as a lower electrode. The magnetic head 7 and the magnetic disk 76 are separated by a small air-gap. When a low voltage is applied to the head-disk interface (HDI), the flying height decreases with the applied voltage according to the equation $f=k\ v^2/d^2$. The symbol f represents the attractive force between the two electrodes (i.e. the head 7 and the disk 76). The symbol k represents a constant value. The symbol v represents voltage applied to the electrodes, or the potential difference in the electrostatic field between the head 7 and the disk 76. The symbol d represents the distance between the head 7 and the disk 76. The equation illustrates that d will decrease with increasing applied voltage, as required by increased f at high voltages. In other words, applying a voltage may decrease the spacing between the head and disk.

In one embodiment, a first electrical conductor 310 and a second electrical conductor 320 may couple the magnetic head 7 to an electronic feedback system 330. The first electrical conductor may apply a voltage to the magnetic head 310. The first electrical conductor 310 may be coupled to the magnetic head 7 by adding an electrical pad at the trailing edge of the slider 5 in the wafer process. The electrical pad may be separate from any pads of the magnetic head 7 and electrically isolated from any such pads. The slider 5 may be electrically isolated from the suspension 74, which is usually grounded. The slider 5 may be coupled to the suspension 74 using an adhesive 340 with high electrical resistance, allowing no current leakage to the ground through the suspension 74 when a small voltage is applied to the slider 5. A flying height monitor system, or electronic feedback system 330, may be built into the disk drive electronics system to accurately control flying height for each individual head and to prevent possible head-disk contact while the flying height is being lowered. The feedback system 330 monitors the head-disk spacing by using a read-back signal sent via the second electrical conductor 320. The read-back signal may be amplitude, amplitude modulation or other electrical signals that are sensitive to the head-disk spacing changes. The read-back signal may also include data regarding the temperature or other environmental conditions surrounding the slider 7. The feedback system 330 may control the head-disk spacing by sending accurate voltages to the slider 7 based on the measured head-disk spacing.

Figure 4:
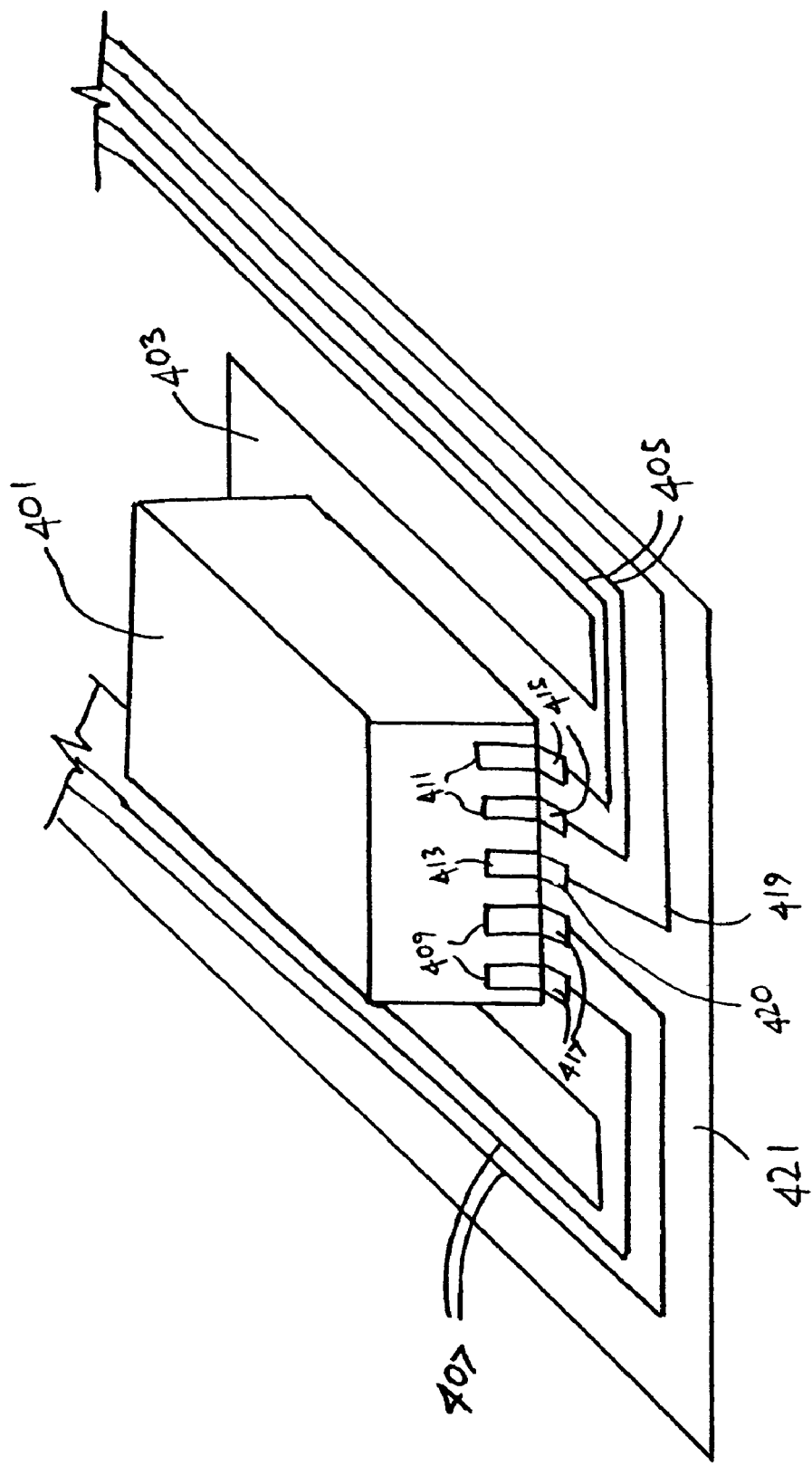
FIG. 4 illustrates one embodiment of the slider with a charging bonding pad as practiced in the present invention.

Referring to FIG. 4, a first embodiment of the present invention is shown. In this embodiment, a slider 401 is provided including read and write electrical components at a trailing end of the slider. Bonding pads 409 and 411 are provided on the slider for electrically connecting the read and write electrical components to electrical components on the suspension 421. In this embodiment, the electrical components of the suspension include four conductive traces 405, 407 that are coupled to bonding pads 415, 417, respectively, for read/write signals. In a typical suspension as known in the art, the conductive traces 405, 407 may be incorporated into the suspension 421, or created separately in a flex circuit or the like that is coupled to the suspension. Also, the traces are electrically coupled to electrical components of the disk drive (e.g., a preamplifier, not shown specifically in FIG. 4) that control the reading of data from and writing of data to the storage medium.

According to this embodiment of the present invention, the slider 401 is coupled to a tongue 403 of the suspension in a conventional manner (e.g., with an electrically insulative adhesive). A separate charging bonding pad 413 is provided on an outer surface of the slider 401. This charging bonding pad 413 is electrically connected to the slider 401, either through direct contact or conducting paths built in the head structure. A separate charging pad 420 is provided on the suspension along with a charging trace 419 to provide a conductive path to the electrical feedback system 330. After the slider 401 is attached to the tongue 403, the bonding pads 409, 411, 413 of the slider may be electrically coupled to the bonding pads 417, 415, 420 of the suspension by, for example, gold ball bonding structure. Other methods of electrical connection may be used including ultrasonic bonding and soldering.

Figure 5:
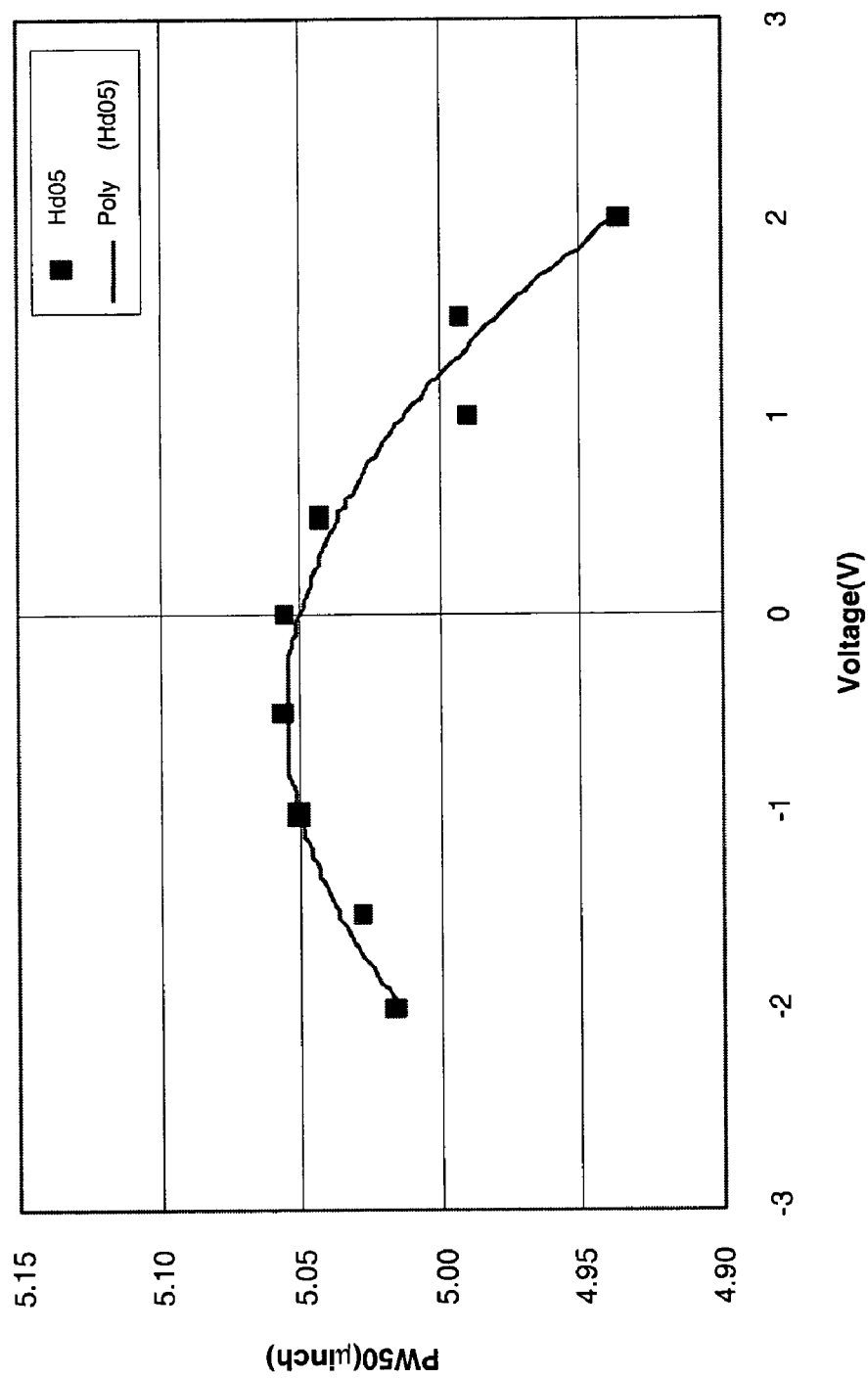
FIG. 5 shows a typical chart of Guzik measurements, where the head-disk spacing change is plotted against applied voltage.

FIG. 5 shows a typical chart of dynamic electric testing (DET) measurements, where the head-disk spacing change is plotted against applied voltage. The head-disk spacing change was measured by the power width at 50% height of a read-back signal pulse (PW50). The PW50 changes linearly with the head-disk spacing. To obtain these measurements, a DC power supply was used as the voltage source, and voltages −2 to +2 volts were used. As indicated in the plot, the flying height (PW50) decreases with applied voltage, regardless of whether the voltage is positive or negative. For a voltage range of 0–2 volts, the PW50 change is about 0.12 μin or 0.06 μin/volt. So for a flying height increase of 0.06 μin, as may occur at cold operation conditions, 1 volt would be sufficient to compensate.

One concern with applying a charge or voltage at the head-disk interface is the possibility of electrostatic damage to the giant magneto-resistive (GMR) sensor. Most GMR sensors used in the industry have a threshold of about 5 volts. Therefore applying low voltages, such as voltages of 1 volt or less, to the head-disk interface seems unlikely to cause electrostatic damage to the GMR sensor.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A slider, comprising:
   a magnetic head coupled to the slider, the magnetic head having a first set of electrical pads to read data from a magnetic storage medium and a second set of electrical pads to write data to the magnetic storage medium;
   a charging electrical pad coupled to the magnetic head; and
   a charging electrical conductor coupled to the electrical pad to apply an electrical charge to the magnetic head to create an electrostatic force to adjust the flying height of the slider.

2. The slider of claim 1, wherein the charging electrical pad is coupled to a trailing edge of the slider.

3. The slider of claim 1, wherein the slider is coupled to a suspension.

4. The slider of claim 3, wherein the slider is electrically isolated from the suspension.

5. The slider of claim 4, wherein the slider is coupled to the suspension using an adhesive with a high electrical resistance.

6. The slider of claim 1, wherein the slider is connected to an electronic feedback system, the electronic feedback system to monitor an environmental condition of the slider.

7. The slider of claim 6, wherein the charging electrical conductor is connected to the electronic feedback system, the charging electrical conductor applying the electrical charge based upon a flying height of the slider.

8. The slider of claim 6, wherein the charging electrical conductor is connected to the electronic feedback system, the charging electrical conductor applying the electrical charge based upon a surrounding temperature of the slider.

9. The slider of claim 1, wherein the electrical charge ranges between 0.1–5 volts.

10. A system, comprising:
    a magnetic storage medium;
    a suspension;
    a slider coupled to the suspension;
    a magnetic head coupled to the slider, the magnetic head having a first set of electrical pads to read data from the magnetic storage medium and a second set of electrical pads to write data to the magnetic storage medium;
    a charging electrical pad coupled to the magnetic head; and
    a charging electrical conductor coupled to the electrical pad to apply an electrical charge to the magnetic head to create an electrostatic force to adjust the flying height of the slider.

11. The system of claim 10, wherein the charging electrical pad is coupled to a trailing edge of the slider.

12. The system of claim 10, wherein the slider is electrically isolated from the suspension.

13. The system of claim 10, wherein the slider is coupled to the suspension using an adhesive with a high electrical resistance.

14. The system of claim 10, wherein the slider is connected to an electronic feedback system, the electronic feedback system to monitor an environmental condition of the slider.

15. The system of claim 14, wherein the charging electrical conductor is connected to the electronic feedback system, the charging electrical conductor applying the electrical charge based upon a flying height of the slider.

16. The system of claim 14, wherein the charging electrical conductor is connected to the electronic feedback system, the charging electrical conductor applying the electrical charge based upon a surrounding temperature of the slider.

17. The system of claim 10, the electrical charge ranges between 0.1–5 volts.

18. A method, comprising:
    suspending a slider with a magnetic head above a magnetic data storage medium, the magnetic head coupled to a charging electrical pad isolated electrically from a set of read electrical pads and a set of write electrical pads on the magnetic head;
    applying an electrical voltage to the charging electrical pad to create an electrical charge on the magnetic head in relation to the magnetic data storage medium to create an electrostatic force to adjust the flying height of the slider.

19. The method of claim 18, wherein the charging electrical pad is coupled to a trailing edge of the slider.

20. The method of claim 18, wherein the slider is coupled to a suspension.

21. The method of claim 20, wherein the slider is electrically isolated from the suspension.

22. The method of claim 20, wherein the slider is coupled to the suspension using an adhesive with a high electrical resistance.

23. The method of claim 18, further including monitoring environmental conditions of the slider.

24. The method of claim 23, further including applying the electrical charge based upon a flying height of the slider.

25. The method of claim 23, further including applying the electrical charge based upon a surrounding temperature of the slider.

26. The method of claim 18, wherein the electrical charge ranges between 0.1–5 volts.

* * * * *

UNITED STATES PATENT AND TRADEMARK OFFICE
CERTIFICATE OF CORRECTION

PATENT NO. : 7,042,670 B2 Page 1 of 1
APPLICATION NO. : 10/618145
DATED : May 9, 2006
INVENTOR(S) : Zhu Feng et al.

It is certified that error appears in the above-identified patent and that said Letters Patent is hereby corrected as shown below:

Column 2, line 41: Delete "dr"

Signed and Sealed this

Seventh Day of August, 2007

JON W. DUDAS
*Director of the United States Patent and Trademark Office*